(12) United States Patent
Obukhov et al.

(10) Patent No.: US 9,330,143 B2
(45) Date of Patent: May 3, 2016

(54) DATA STORAGE DEVICE SUPPORTING ACCELERATED DATABASE OPERATIONS

(71) Applicant: Western Digital Technologies, Inc., Irvine, CA (US)

(72) Inventors: Dmitry S. Obukhov, San Jose, CA (US); Marc A. Bombet, Coto de Caza, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 190 days.

(21) Appl. No.: 14/133,302

(22) Filed: Dec. 18, 2013

(65) Prior Publication Data

US 2015/0120770 A1  Apr. 30, 2015

Related U.S. Application Data

(60) Provisional application No. 61/895,263, filed on Oct. 24, 2013.

(51) Int. Cl.
  *G06F 17/30* (2006.01)
(52) U.S. Cl.
  CPC .... *G06F 17/30483* (2013.01); *G06F 17/30501* (2013.01); *Y10S 707/99933* (2013.01)
(58) Field of Classification Search
  CPC .......... G06F 21/6227; G06F 17/30306; G06F 2209/481; G06F 17/30501; G06F 2212/217; Y10S 707/99933
  USPC ........................................................ 707/758
  See application file for complete search history.

(56) References Cited

U.S. PATENT DOCUMENTS

| | | | |
|---|---|---|---|
| 6,401,185 B1 * | 6/2002 | Sexton | G06F 7/72 711/200 |
| 6,446,062 B1 * | 9/2002 | Levine | G06F 17/30404 707/690 |
| 6,549,977 B1 | 4/2003 | Horst et al. | |
| 6,856,556 B1 | 2/2005 | Hajeck | |
| 7,055,015 B2 * | 5/2006 | Shiota | G06F 12/109 711/202 |
| 7,126,857 B2 | 10/2006 | Hajeck | |
| 7,424,478 B2 * | 9/2008 | Licon | G06F 17/30867 |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |

(Continued)

OTHER PUBLICATIONS

International Search Report and Written Opinion dated Jan. 27, 2015 from related PCT Serial No. PCT/US2014/062066, 9 pages.

(Continued)

*Primary Examiner* — Thanh-Ha Dang
(74) *Attorney, Agent, or Firm* — Wilmer Cutler Pickering Hale and Dorr LLP (57) ABSTRACT

Disclosed herein are data storage device embodiments for accelerating database operations and associated methods. In one embodiment, the data storage device includes a controller; an array of one or more solid-state memory storage devices; a first memory for storing processor executable instructions associated with database operations; and a second memory for storing data related to the database operations; wherein the controller is configured to execute the instructions to: cause data to be read from the solid-state memory storage devices into the second memory; determine whether the data match a query specified by the instructions; and perform a database operation based on the query match determination.

28 Claims, 8 Drawing Sheets

(56) References Cited

U.S. PATENT DOCUMENTS

| | | |
|---|---|---|
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0116457 A1 | 8/2002 | Eshleman et al. |
| 2002/0178328 A1* | 11/2002 | Honda et al. ............... 711/114 |
| 2004/0225831 A1* | 11/2004 | Pail ...................... G06F 11/073 711/105 |
| 2006/0143238 A1 | 6/2006 | Tamatsu |
| 2007/0204128 A1* | 8/2007 | Lee ...................... G06F 12/0246 711/173 |
| 2008/0071785 A1* | 3/2008 | Kabra ............... G06F 17/30306 |
| 2008/0140918 A1* | 6/2008 | Sutardja ............ G06F 12/0246 711/103 |
| 2009/0138654 A1* | 5/2009 | Sutardja ............ G06F 12/0246 711/103 |
| 2009/0288101 A1* | 11/2009 | Gandin .................. G06F 9/4812 719/314 |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2011/0296440 A1 | 12/2011 | Laurich et al. |
| 2012/0179869 A1* | 7/2012 | Flynn ...................... G06F 1/183 711/114 |
| 2012/0221534 A1 | 8/2012 | Gao et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0215129 A1* | 7/2014 | Kuzmin ............... G06F 12/0246 711/103 |
| 2014/0223255 A1 | 8/2014 | Lu et al. |

OTHER PUBLICATIONS

Sungchan Kim, et al., "Fast, Energy Efficient Scan inside Flash Memory SSDs," The Second International Workshop on Accelerating Data Management Systems using Modern Processor and Storage Architecture (ADMS' 11), 2011, pp. 1-8.

* cited by examiner

| L PAGES | L PAGE 0 | L PAGE 1 | L PAGE 2 | L PAGE 3 | L PAGE 4 | ... | L-Page N-1 |
|---|---|---|---|---|---|---|---|
| DB FIELDS | NAME | ADDRESS | PHONE | SSN | ACCOUNT NO. | ... | FIELD N-1 |

DATA STORAGE DEVICE SUPPORTING ACCELERATED DATABASE OPERATIONS

CROSS-REFERENCE TO RELATED APPLICATION(S)

This application claims the benefit of U.S. provisional application No. 61/895,263, filed Oct. 24, 2013, entitled "Data Storage Device Supporting Accelerated Database Operations," the disclosure of which is hereby incorporated in its entirety.

BACKGROUND

1. Technical Field

This disclosure relates to non-volatile data storage devices and methods for accelerating data operations in such devices.

2. Description of the Related Art

Database operations are often performed in an environment where speed of execution is of great importance. Common operations such as returning query results and indexing are often I/O-intensive and consume much data bandwidth between a host system (e.g., computing device) and a data storage device at which such operations are executed.

BRIEF DESCRIPTION OF THE DRAWINGS

Systems and methods that embody the various features of the various embodiments of the invention will now be described with reference to the following drawings, in which.

DETAILED DESCRIPTION

Some embodiments of this disclosure are directed to a data storage device (e.g., solid-state drive (SSD)) that is configured to accelerate database operations. In an embodiment, the data storage device supports a variable sized logical page whose size can be customized to match the individual data units (e.g., tuples) within a database data structure. As a result, certain database operations can be accelerated as certain data may be skipped by logical address range(s) to reduce the number of data read out of the storage media and transferred to the host, which results in more efficient database operations.

While certain embodiments of the disclosure are described, these embodiments are presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

Data Storage System Overview

Figure 1A:
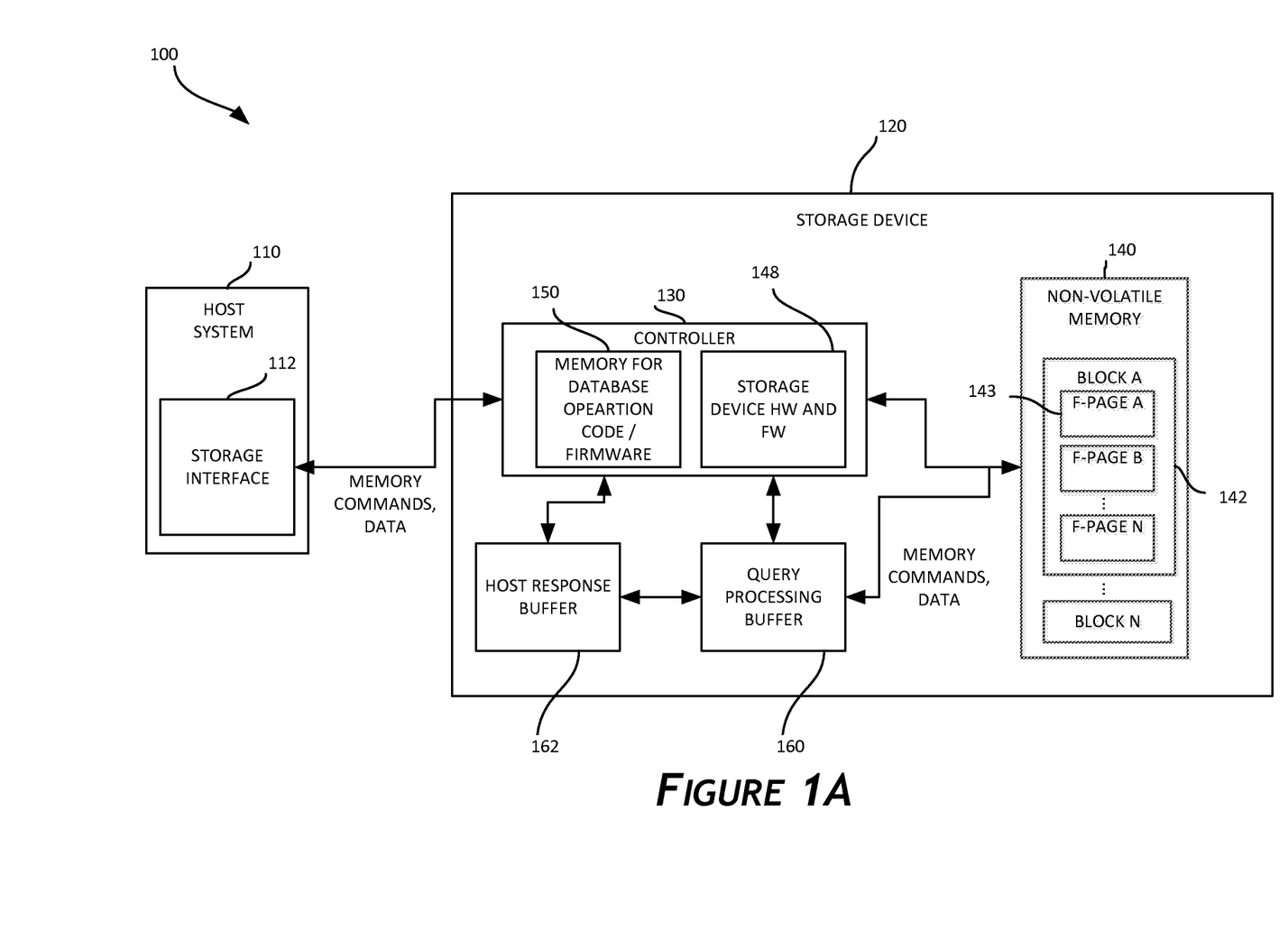
FIG. 1A illustrates an example data storage device according to one embodiment of the invention.

FIG. 1A illustrates an example data storage device 120 according to one embodiment of the invention. As is shown, a data storage device 120 (e.g., solid state drive, hybrid drive, etc.) includes a controller 130 and a non-volatile solid-state memory 140, which comprises one or more units of storage, such as blocks of storage. FIG. 1A illustrates an example where the blocks are identified as block "A" 142 through block "N." While a single non-volatile solid-state memory 140 is illustrated for convenience, the storage device may include multiple of such memories. Each block of the non-volatile solid-state memory 140 comprises a plurality of flash pages (F-pages). For example, block A 142 of FIG. 1A includes a plurality of F-pages, identified as F-pages A 143, B, through N. In some embodiments, each "F-page" is a smallest grouping of memory cells in the non-volatile solid-state memory 140 that can be programmed in a single operation or as a unit. In lieu of or in addition to the non-volatile solid-state memory 140, a magnetic rotating media and/or other non-volatile memory such as MRAM and/or phase change memory may be used.

The controller 130 can receive data and/or storage access commands from a storage interface 112 (e.g., a device driver) in a host system 110. Storage access commands communicated by the storage interface 112 can include write and read commands issued by the host system 110. The commands can specify a logical block address in the data storage device 120, and the controller 130 can execute the received commands in the non-volatile solid-state memory 140. In a hybrid hard drive, data may be stored in magnetic media storage component (not shown in FIG. 1A) in addition to the non-volatile solid-state memory 140.

The data storage device 120 can store data received from the host system 110 so that the data storage device 120 can act as memory storage for the host system 110. To facilitate this function, the controller 130 can implement a logical interface. The logical interface can present to the host system 110 the storage device's memory as a set of logical addresses (e.g., contiguous address) where data can be stored. Internally, the controller 130 can map logical addresses to various physical memory addresses in the non-volatile solid-state memory 140 and/or other memory module(s).

In one embodiment, the controller 130 includes storage device hardware and firmware 148 and a memory for database operation code/firmware 150. The storage device hardware and firmware 148 is/are used to control data operations within the data storage device. In one embodiment, the database operation code/firmware in memory 150 is configurable by the host, and can be executed in its own dedicated processor (not shown in FIG. 1A). Those queries are executed against data stored in the non-volatile solid-state memory 140. Data related to the queries are temporarily stored in a query processing buffer 160 and results are returned to the host system 110 via a host response buffer 162. Additional details related to how the components interact are provided below. It is noted that these components may be arranged differently in various embodiments. They may be omitted, combined, or separated into further sub-components. Also, components 148, 150, 160, and 162 may be integrated into a single processor package or implemented as various discrete components in communication with one another.

Figure 1B:
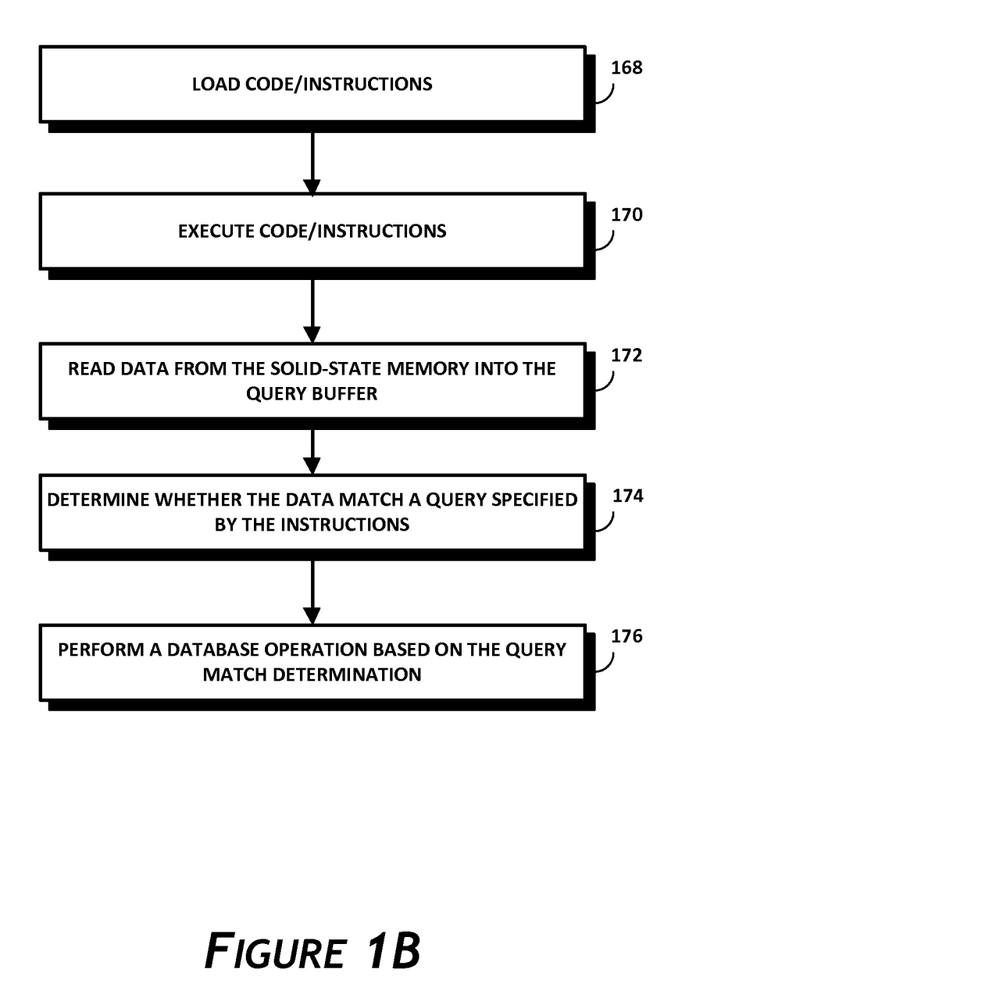
FIG. 1B illustrates an example database operation acceleration method according to one embodiment of the invention.

FIG. 1B illustrates an example database operation acceleration method according to one embodiment. In one embodiment, the controller 130 is configured to perform the flow shown in FIG. 1B. At block 168, the controller is configured to load instructions/code into the memory 150. The instructions/code may be from a host system. At block 170, the controller is configured to execute instructions in the memory

150. In one embodiment, a dedicated processor may be used to handle the executions to provide further acceleration. At block 172, the controller is configured to cause data to be read from the solid-state memory 140 into the query processing buffer 160. At block 174, the controller is configured to determine whether the data match a database query specified by the instructions. At block 176, the controller is configured to perform a database operation based on the query match determination. In one embodiment, one or more actions in blocks 172-176 may be triggered as a result of executing the instructions. As will be explained further below, the database operation performed may include, for example, one or more of: (1) returning data matching the query to the host system 110; (2) adding an indication to an index when the data matches the query; (3) modifying the data matching the query and writing the modified data back to the solid-state memory.

Acceleration of Database Operations

Figure 2:
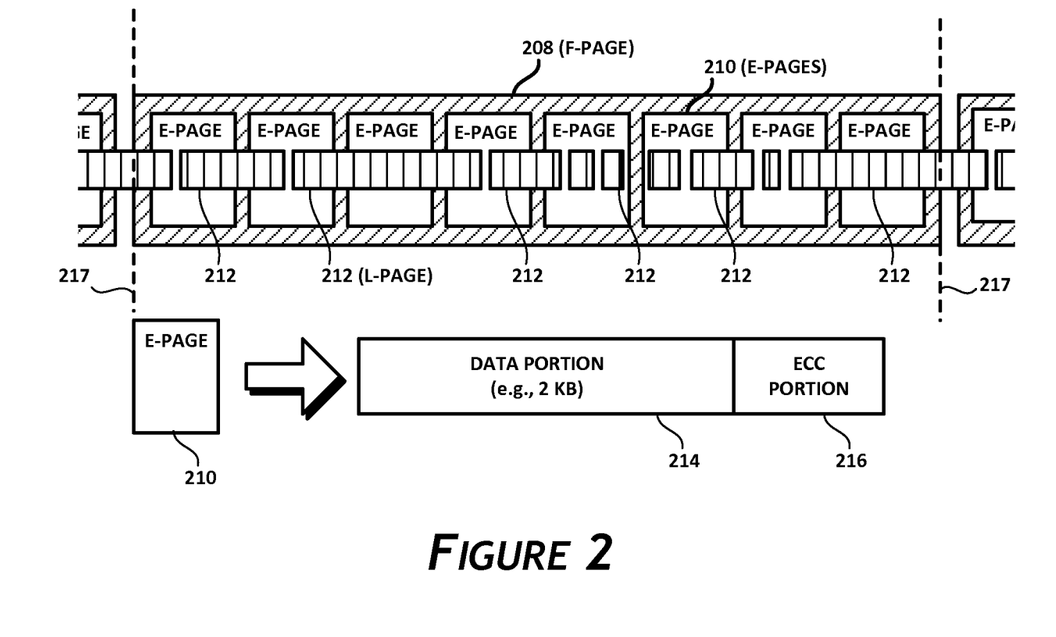
FIG. 2 shows the internal data layout of the data storage device according to one embodiment.

FIG. 2 shows the internal data layout of the data storage device according to one embodiment. As shown, logical pages (L-Pages) 212 of variable size are stored across various error correction pages (E-Page 210), which are themselves physical sub-division of physical flash pages F-Pages 208. In some embodiments, there is one E-Page per F-Page, i.e., the F-Pages are not sub-divided. The L-Pages may cross the underlying physical boundaries of the E-Pages, F-Pages, as well as the boundaries of the dies/blocks/units within the non-volatile solid-state memory 140 (as shown by boundary 217). For example, as shown, L-Pages may be distributed across multiple E-Pages. In an example implementation, an E-Page 210 may have a data portion 214 protected by an ECC portion 216. In some implementations, compression may be used to further change the size of the L-Page as written to the non-volatile solid-state memory.

Figure 3A:
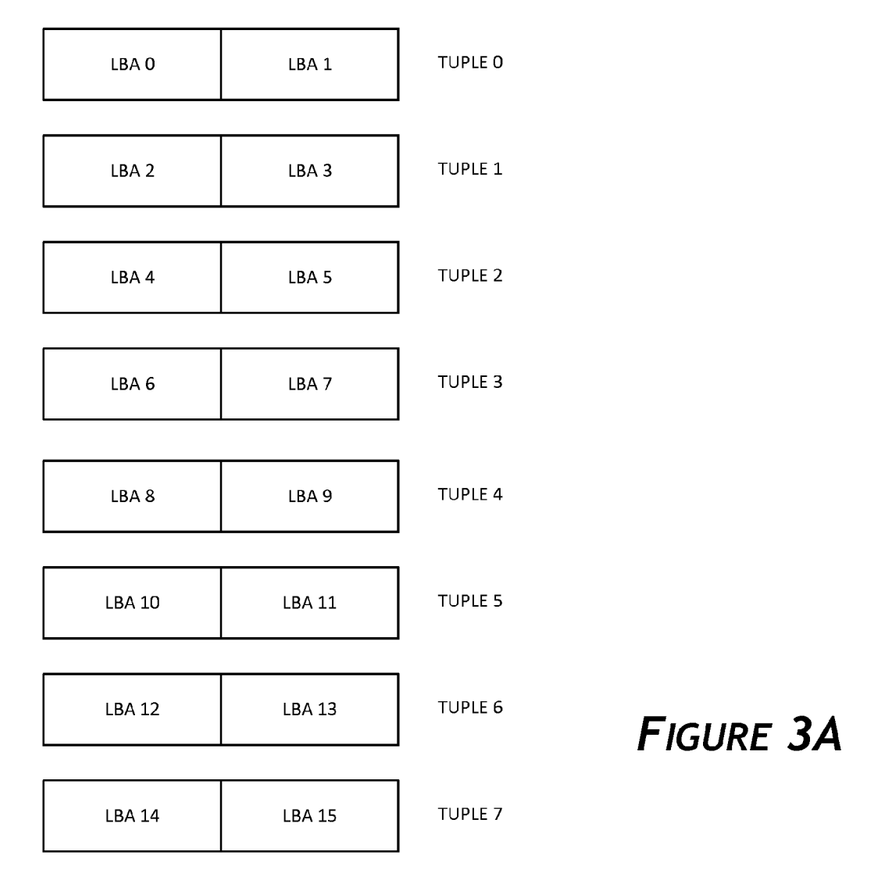
FIGS. 3A and 3B are block diagrams showing example layouts of database elements according to one embodiment.

In one embodiment, the size of the logical page is configured to be equal to the size of a tuple of the database, or an integer multiple of it. Due to this flexibility in the logical page size, a database administrator, when designing/configuring the database, can create a matching correlation between the stored data and the access index. For example, as shown in FIG. 3A, if one tuple takes 2 logical pages, in order to read tuple 7, read logical block addresses (LBAs) 14 and 15 would be read. Having the data indexed based on logical address provides many advantages, including eliminating the overhead of partitioning by the host system's operating system (OS) and allowing the use of all available storage.

Figure 3B:
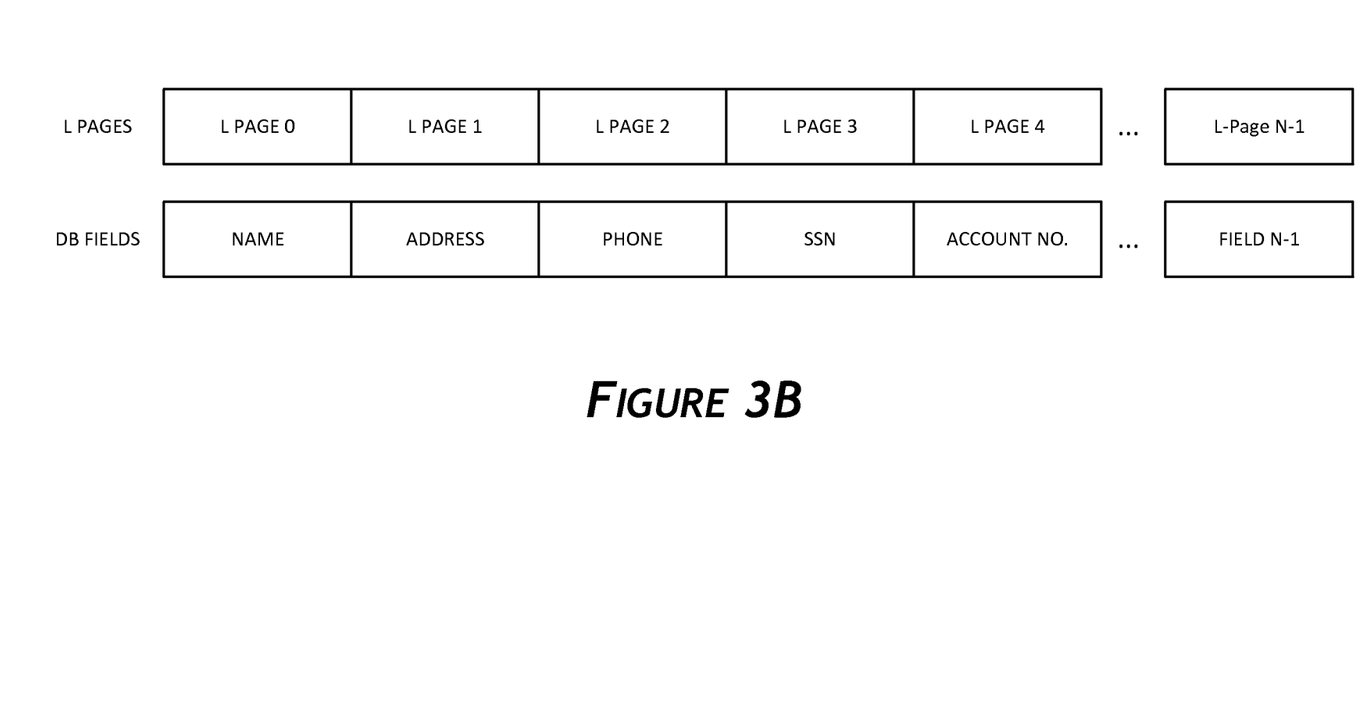

In addition, the logical page and database data alignment may allow for selective skipping of certain logical page ranges in query operations (for example, during the execution of the action in the block 172 in FIG. 1B). For example, in FIG. 3B, the data record is set up so that the logical page boundaries are aligned with individual fields of a database record. For example, if a user is interested in accessing just the name and address fields, targeted reads can be executed to read L-Page 0 and L-Page 1. It can be appreciated that the example shown in FIG. 3B shows one record and that the same principle can be extended to the case when reading many different records. Following this example further, because of the field and logical address alignment, the index to certain fields can be accessed by a modulo operation on the logical address. By allowing the skipping of certain logical address(es) in the preconfigured logical page arrangement, the database performance can be substantially improved over conventional approaches in which all data is read and then matching results are filtered and provided. In addition, the logical page address can be accessed based on formula and/or condition. For example, different database users may have different access privileges. One user may only have access to the name, address, and phone fields. So for that user, a logic may be formulated such that his query would be blocked from accessing L-Page 3, N+3, 2N+3, etc., as well as L-Page 4, N+4, 2N+4, etc. where N is the number of fields in the record. Another user who has a higher access privilege may access additional fields such as social security number and account number, and a formula based on different logic can be used to allow that access. The different queries as a result of the different access privileges are efficiently handled when the fields are aligned with the logical page boundaries, allowing the data storage device to perform the filtering that is common to many database operations at the storage device's logical address level.

In one embodiment, the data storage device includes a dedicated buffer for query processing, e.g., the query processing buffer 160 shown in FIG. 1, or "QPB." In one embodiment, the QPB is a part of a data path and is capable to hold one logical page.

In addition, in one embodiment, the data storage device includes a buffer to hold a response to the host query, e.g., the host response buffer 162 shown in FIG. 1, or "HRB." The size of the buffer in one embodiment is an integer multiple of the logical page size but can be different depending on the configuration.

In addition, in one embodiment, the data storage device includes a dedicated processor to execute host-provided code (xenocode, or XC). In one embodiment, xenocode shall have as minimum read access to the query processing buffer 160 and read/write access to the host response buffer 162. In one embodiment, the data storage device includes a code memory for the xenocode (XC memory or XCM), as shown in element 150 of FIG. 1. The size of XCM may be sized to be large enough to execute queries. In addition, in one embodiment, the data storage device has a set of control registers (XCR) allowing the storage device's hardware and firmware (e.g., 148 in FIG. 1) to communicate with the xenocode and providing hardware mechanisms to reset and un-reset the xenocode. In one embodiment, a "watchdog" function is provided such that the execution of the xenocode is monitored for hung or timed-out condition so that the device's hardware/firmware can reset the execution of the xenocode and prevent the entire storage device from hanging and timing out.

In one embodiment, the data storage device is configured to provide to the host information about XC type, size of the XCM and HRB, XCR configuration, and execution timing. This information can be provided electronically or in the product documentation.

Query Execution Flows

Figure 4A:
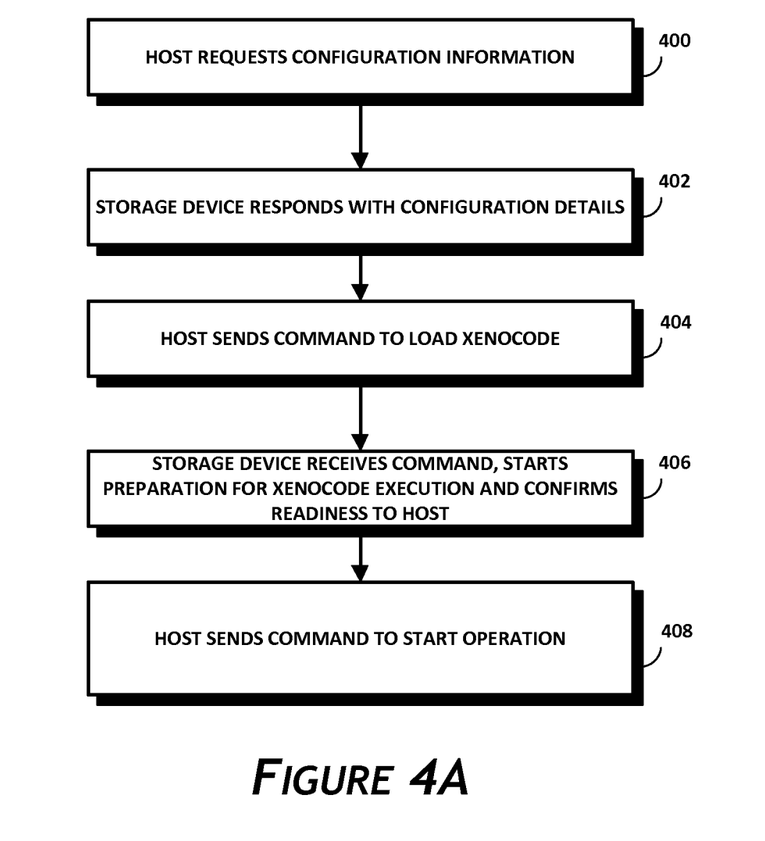
FIGS. 4A and 4B are flow diagrams showing how a filtered read operation may be executed according to one embodiment.
Figure 4B:
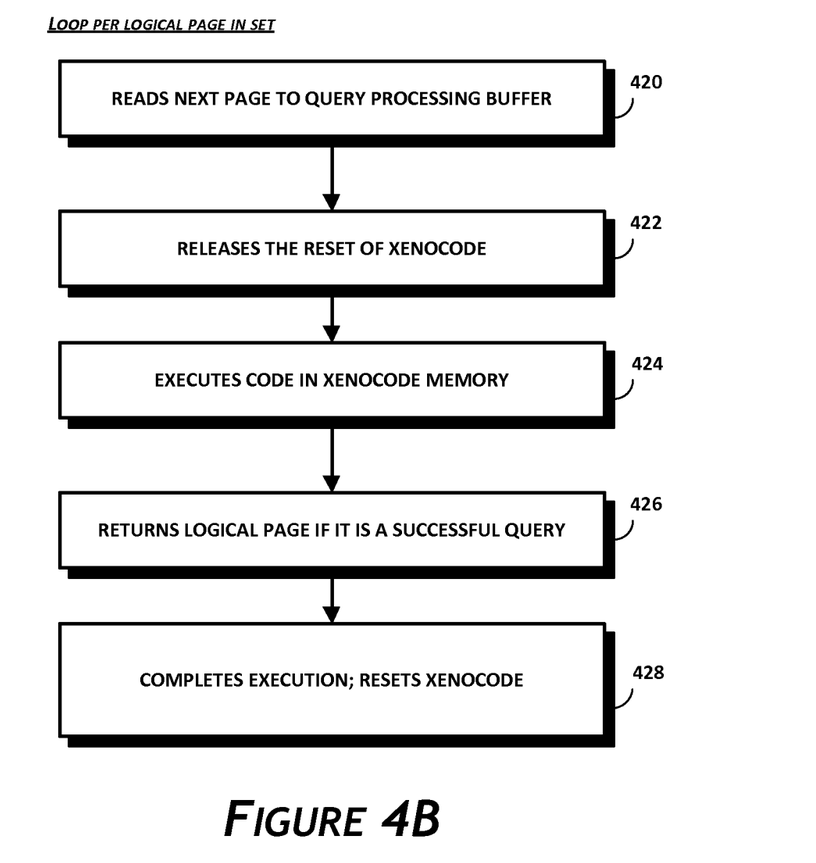

In one embodiment, the data storage device may be filled with relational database tuples in accordance with the description above. FIGS. 4A and 4B shows how a filtered read may be executed. FIG. 4A shows some of the initialization that takes place in anticipation of the query execution. In block 400, the host system requests configuration information from the data storage device. The information may be related to various settings including xenocode set up information. In block 402, the data storage device responds with the requested configuration information, including details such as XC type, XCM size, QPB and HRB mapping, execution time, etc. In block 404, the host system sends a command (e.g., a vendor specific command (VSC)) to load the xenocode for execution. The xenocode could have been previously sent by the host system for storage in the XCM or the solid-state memory of the data storage device. This allows for maximum flexibility by the host to configure/alter the xenocode as needed, while offering the benefits of optimized query execution that is localized with the data storage. In one embodiment, hardware may be used to further speed up these operations. In block 406, the data storage device receives the command, starts preparation for the execution of the xenocode, and confirms readiness to the host system. The preparation work may include filling up the XCM with a given image, clearing up the HRB etc. In block 408, the host system sends a command (e.g., VSC) to start the operation (e.g., in this case, XC-filtered read with a set of logical pages).

FIG. 4B shows a part of the flow of the filtered read operation. FIG. 4B shows the actions performed for every logical page in the set. In block 420, the data storage device reads the next logical page into the query processing buffer. In block 422, the data storage device releases the reset of the xenocode. The reset is related to the watchdog monitor to ensure that the code executes properly and does not result in a hung condition. Then in block 424, the code in the xenocode memory is executed. If the query result is successful, the xenocode writes an indication to the xenocode register (e.g., XCR.Good=1), in block 426. In one embodiment, when xenocode execution is completed, it writes a completion indication in the xenocode register (e.g., XCR.Done=1). This causes the data storage device to send the logical page to the host system (e.g., via the host response buffer) and reset xenocode (block 428). In one embodiment, if the xenocode takes too long to execute, the watchdog resets the xenocode. The logical page is considered to not match the query. As a result of the execution in FIGS. 4A and 4B, the data storage device may internally read all the database tuples, but only matching records are transferred to the host. This localized processing reduces the amount of data transfer and thus increases data throughput. The processing can further be coupled and/or supplemented with the storage device's hardware acceleration to deliver even better improvement. In one implementation, this filtered read operation may be performed in addition to the filtered reads based on logical addresses as previously described.

Figure 5:
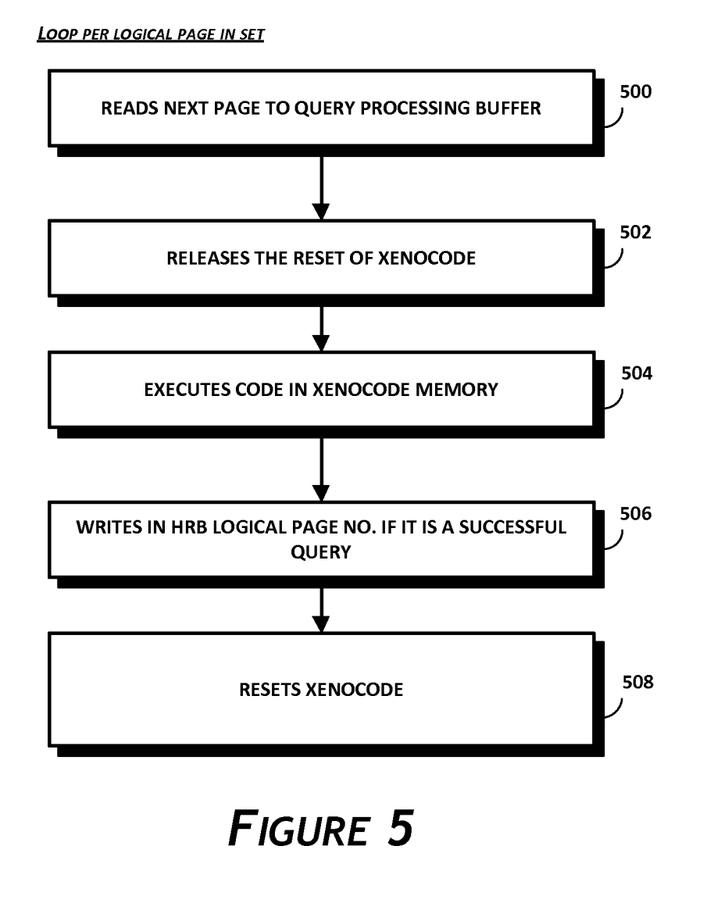
FIG. 5 is a flow diagram showing how an indexing operation may be executed according to one embodiment.

In one embodiment, an indexing operation may take place as follows. Much like FIG. 4A, the host system and the data storage device may perform some initialization operations. Once the initialization is completed, in one embodiment the host system sends a command (e.g., VSC) to create xenocode-assisted subset of logical pages with a set of logical pages. The process flows for each logical page in the set is shown in FIG. 5. The data storage device reads the next logical page to the query processing buffer in block 500. In block 502, the data storage device releases the reset of the xenocode. Then in block 504, the code in the xenocode memory is executed. If the query result is successful, the xenocode writes to the host response buffer the logical page number (e.g., XCR.Page), in block 506. In one embodiment, when xenocode execution is completed, it writes a completion indication in the xenocode register (e.g., XCR.Done=1). This causes the data storage device to reset xenocode (block 508). The logical page may also optionally be sent to the host system. In one embodiment, if the xenocode takes too long to execute, the watchdog resets the xenocode. In such case, the logical page is considered to not match the query. After the set is completed, the data storage device sends to the host system the content of the HRB, giving the host system the results of the index operation. In one embodiment, instead of, or in addition to, returning set of the matching pages, the xenocode may provide more sophisticated operations, such as calculating average values, or doing other statistical analysis.

In one embodiment, the data storage device may provide configurable watchdog timing to better match xenocode execution with expected traffic.

In one embodiment, the data storage device can go beyond read-only access to the data content. For example, the xenocode can provide read-modify-write operations if necessary. The data storage device may implement this functionality by supporting write access to the query processing buffer by the xenocode, and providing the ability to write the modified logical page back to the solid-state memory. The xenocode, for example, may be configured to read out a page matching certain value, perform some operation, and write the modified page back to the solid-state memory. This can be done without data transfer between the host system and the data storage device and without requiring the host system's processing power to perform such operations.

Other Variations

Those skilled in the art will appreciate that in some embodiments, other approaches and methods can be used. For example, the non-volatile solid-state memory array can be implemented using NAND flash memory devices. Other types of solid-state memory devices can alternatively be used, such as array of flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NOR memory, EEPROM, Ferroelectric Memory (FeRAM), Magnetoresistive RAM (MRAM), other discrete NVM (non-volatile solid-state memory) chips, or any combination thereof. In one embodiment, the non-volatile solid-state memory array preferably includes multi-level cell (MLC) devices having multi-level cells capable of storing more than a single bit of information, although single-level cell (SLC) memory devices or a combination of SLC and MLC devices may be used. In one embodiment, the data storage device 120 can include other memory modules, such as one or more magnetic memory modules. In addition, the systems and methods of this disclosure may also be useful in more conventional hard drives and hybrid drives including both solid-state and hard drive components. For example, certain hard disk drive employing magnetic recording technology may employ the data addressing and processing schemes described above.

While certain embodiments of the disclosure have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, the various components described may be implemented as software and/or firmware on a processor, ASIC/FPGA, or dedicated hardware. For example, those skilled in the art will appreciate that in some embodiments, the actual steps taken in the processes of some embodiments may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile data storage device, comprising:
   a controller;
   an array of one or more solid-state memory storage devices;
   wherein the array of one or more solid-state memory storage devices is configured to:
   store a plurality of logical pages, the size of the logical pages configured to correspond to a size of a tuple of a database; and
   store data that is indexable based on a plurality of logical addresses corresponding to the plurality of logical pages;
   a first memory for storing processor executable instructions associated with database operation; and
   a second memory for storing data related to the database operations;
   wherein the controller is configured to execute the instructions, the instructions causing the controller to:
   cause data to be read from the solid-state memory storage devices into the second memory;
   determine whether the data match a query specified by the instructions; and
   perform a database operation based on the query match determination.

2. The non-volatile data storage device of claim 1 wherein the database operation performed includes returning data matching the query to a host system coupled to the data storage device.

3. The non-volatile data storage device of claim 1 wherein the database operation performed includes adding an indication to an index when the data matches the query.

4. The non-volatile data storage device of claim 1 wherein the database operation performed includes modifying the data matching the query and writing the modified data back to the solid-state memory storage devices.

5. The non-volatile data storage device of claim 1, wherein the first memory is configured to store database operations that are configurable by a host system coupled to the data storage device.

6. The non-volatile data storage device of claim 1, wherein the controller is further configured to perform a query-related database operation by selectively skipping reading of the logical pages.

7. The non-volatile data storage device of claim 6, wherein the selectively skipping is based on logic associated with user data access privilege.

8. The non-volatile data storage device of claim 6, wherein the selectively skipping is based on logic associated with a query.

9. The non-volatile data storage device of claim 6, wherein the selectively skipping is performed by a modulo operation on a logical address associated with one or more of the logical pages.

10. The non-volatile data storage device of claim 1, wherein the controller is further configured to initiate a watchdog timer upon execution of the instructions to prevent a hung condition.

11. The non-volatile data storage device of claim 1, wherein the controller is further configured to perform one or more logic operations on the data in the second memory.

12. The non-volatile data storage device of claim 11, wherein the logic operations include an aggregation operation and a summing operation.

13. The non-volatile data storage device of claim 1, wherein the controller comprises a processor dedicated to execute the instructions.

14. The non-volatile data storage device of claim 1, wherein the instructions are received from a host system coupled to the data storage device.

15. A method of performing data operation in a non-volatile data storage device comprising an array of one or more solid-state memory storage devices, a first memory, and a second memory, the method comprising:
   storing a plurality of logical pages in one or more solid-state memory storage devices, the size of the logical pages configured to correspond to a size of a tuple of a database;
   storing data pages in one or more solid-state memory storage devices, wherein the data is indexable based on a plurality of logical addresses corresponding to the plurality of logical pages;
   reading data from the solid-state memory storage devices of the non-volatile data storage device into the second memory;
   determining whether the data match a query specified; and
   performing a database operation based on the query match determination, wherein:
   the first memory is configured to store processor executable instructions associated with database operations and the query is specified by the instructions; and
   the second memory is configured to store data related to the database operations.

16. The method of claim 15 wherein the database operation performed includes returning data matching the query to a host system coupled to the data storage device.

17. The method of claim 15 wherein the database operation performed includes adding an indication to an index when the data matches the query.

18. The method of claim 15 wherein the database operation performed includes modifying the data matching the query and writing the modified data back to the solid-state memory storage devices.

19. The method of claim 15, wherein the first memory is configured to store database operations that are configurable by a host system coupled to the data storage device.

20. The method of claim 15, further comprising: performing a query-related database operation by selectively skipping reading of the logical pages.

21. The method of claim 20, wherein the selectively skipping is based on logic associated with user data access privilege.

22. The method of claim 20, wherein the selectively skipping is based on logic associated with a query.

23. The method of claim 20, wherein the selectively skipping is performed by a modulo operation on a logical address associated with one or more of the logical pages.

24. The method of claim 15, further comprising: initiating a watchdog timer upon execution of the instructions to prevent a hung condition.

25. The method of claim 15, further comprising: performing one or more logic operations on the data in the second memory.

26. The method of claim 25, wherein the logic operations include an aggregation operation and a summing operation.

27. The method of claim 15, wherein the instructions are executed in a dedicated processor.

28. The method of claim 15, wherein the instructions are received from a host system coupled to the data storage device.

* * * * *